United States Patent
Kadu et al.

(10) Patent No.: US 11,954,485 B1
(45) Date of Patent: Apr. 9, 2024

(54) CLASSIFICATION OF PROGRAMMING LANGUAGE CODE INTO BASIC CONSTRUCTS OF SOURCE CODE AND NON-SOURCE CODE

(71) Applicant: Synopsys, Inc., Mountain View, CA (US)

(72) Inventors: Mayur Kadu, Burlington, MA (US); Harshad Sathe, Burlington, MA (US); Saheed Olanigan, Burlington, MA (US); Jagat Parekh, Burlington, MA (US)

(73) Assignee: Synopsys, Inc., Sunnyvale, CA (US)

( * ) Notice: Subject to any disclaimer, the term of this patent is extended or adjusted under 35 U.S.C. 154(b) by 192 days.

(21) Appl. No.: 17/356,269

(22) Filed: Jun. 23, 2021

Related U.S. Application Data

(60) Provisional application No. 63/043,957, filed on Jun. 25, 2020.

(51) Int. Cl.
| | |
|---|---|
| *G06F 9/44* | (2018.01) |
| *G06F 8/73* | (2018.01) |
| *G06F 21/10* | (2013.01) |
| *G06N 3/08* | (2023.01) |
| *G06V 30/262* | (2022.01) |

(52) U.S. Cl.
CPC ............... *G06F 8/73* (2013.01); *G06F 21/10* (2013.01); *G06N 3/08* (2013.01); *G06V 30/274* (2022.01)

(58) Field of Classification Search
CPC .. G06F 8/73; G06F 21/10; G06N 3/08; G06V 30/274
USPC ................................................. 717/120–123
See application file for complete search history.

(56) References Cited

U.S. PATENT DOCUMENTS

| | | | | |
|---|---|---|---|---|
| 8,160,964 | B2 * | 4/2012 | Burkhart | G06Q 10/10 705/59 |
| 8,479,161 | B2 * | 7/2013 | Weigert | G06F 8/75 717/124 |
| 8,572,093 | B2 * | 10/2013 | Weigert | G06F 21/10 707/758 |
| 2007/0250448 | A1 * | 10/2007 | Burkhart | G06Q 50/18 705/59 |

OTHER PUBLICATIONS

Vendome et al., "Machine Learning-Based Detection of Open Source License Exceptions", 2017, IEEE, pp. 118-129. (Year: 2017).*

(Continued)

*Primary Examiner* — Ted T. Vo
(74) *Attorney, Agent, or Firm* — Patterson + Sheridan, LLP

(57) ABSTRACT

A method for processing a source code file comprises scanning the source code file to identify text lines, and analyzing, via one or more processors, the text lines with a classifier to identify one or more of the text lines that correspond to code construct type information. The code construct type information includes license information. The classifier is trained with sample source code files. The method further comprises generating a subset of the text lines that excludes the one or more of the text lines identified as corresponding to the code construct type information. Further, the method comprises determining first text lines within the subset that correspond to open source code by comparing the subset to a database. The database includes a plurality of text lines associated with open source code.

20 Claims, 9 Drawing Sheets

(56) References Cited

OTHER PUBLICATIONS

Peterson, "The source code is the license", 2017, retrieved from https://opensource.com/article/17/12/source-code-license, 5 pages. (Year: 2017).*

Sharma et al., "On the Feasibility of Transfer-learning Code Smells using Deep Learning" 2019, arXiv, 34 pages. (Year: 2019).*

Mario Silic, "The Influence of Risk Factors in Decision—Making Process for Open Source Software Adoption", 2016, ResearchGate, pp. 1-40. (Year: 2016).*

* cited by examiner

```
/*
 * Geo Tools - The Open Java GIS Toolkit                    ← 310
 * https://geotools.org
 *
 * (C) 2004-2008, Open Source Geospatial Foundation (OSGeo)
 *
 * This library is free software; you can redistribute it and/or    ← 312
 * modify it under the terms of the GNU Lesser General Public
 * License as published by the Free Software Foundation;
 * version 2.1 of the License.
 *
 * This library is distributed in the hope that it will be useful,
 * but WITHOUT ANY WARRANTY; without even the implied warranty of
 * MERCHANTABILITY or FITNESS FOR A PARTICULAR PURPOSE.
   See the GNU
 * Lesser General Public License for more details.
 */
package org.geotools.geometry.jts;

import java.util.ArrayList;
improve java.util.List;

import com.vividsolutions.jts.geom.CoordinateSequence;          ← 314
import com.vividsolutions.jts.geom.CoordinateSequenceFactory;
import com.vividsolutions.jts.geom.Envelope;
import com.vividsolutions.jts.geom.Geometry;
import com.vividsolutions.jts.geom.GeometryCollection;
import com.vividsolutions.jts.geom.GeometryFactory;
import com.vividsolutions.jts.geom.LineString;
import com.vividsolutions.jts.geom.LinearRing;
import com.vividsolutions.jts.geom.MultiLineString;
import com.vividsolutions.jts.geom.MultiPoint;
import com.vividsolutions.jts.geom.MultiPolygon;
import com.vividsolutions.jts.geom.Point;
import com.vividsolutions.jts.geom.Polygon;
```

```
/**
 * A stateful geometry clipper, can clip linestring on a specified rectangle.
   Trivial benchmarks
 *report a speedup factor between 20 and 60 compared to JTS generic
   intersection algorithm. The                                      ← 316
 *class is not thread safe.
 *
 *@author Andrea Aime - OpenGeo
 *
 *@Source $URL:
 http://svn.osgeo.org/geotools/trunk/modules/library/main/src/main/java
 org/geotools/geometry/jts/Geometry
 Clipper.java $
 */
```
```
Public class GeometryClipper {                                      ← 318
    static private int RIGHT = 2;
    static private int TOP = 8;
    static private int BOTTOM = 4;
    static private int  LEFT = 1;
    final double xmin;
    final double ymin;
    final double xmax;
    final double ymax;
    final Envelope bounds;
    public Envelope getBouds() {
      return bounds;
    } public GeometricClipper(Envelope bounds) {
      this.xmin = bounds.getMinX();
      this.ymin = bounds.getMinY();
      this.xmax = bounds.getMaxX();
      this.ymax = bounds.getMaxY();
      this.bounds = bounds;
    }
```

FIG. 3B

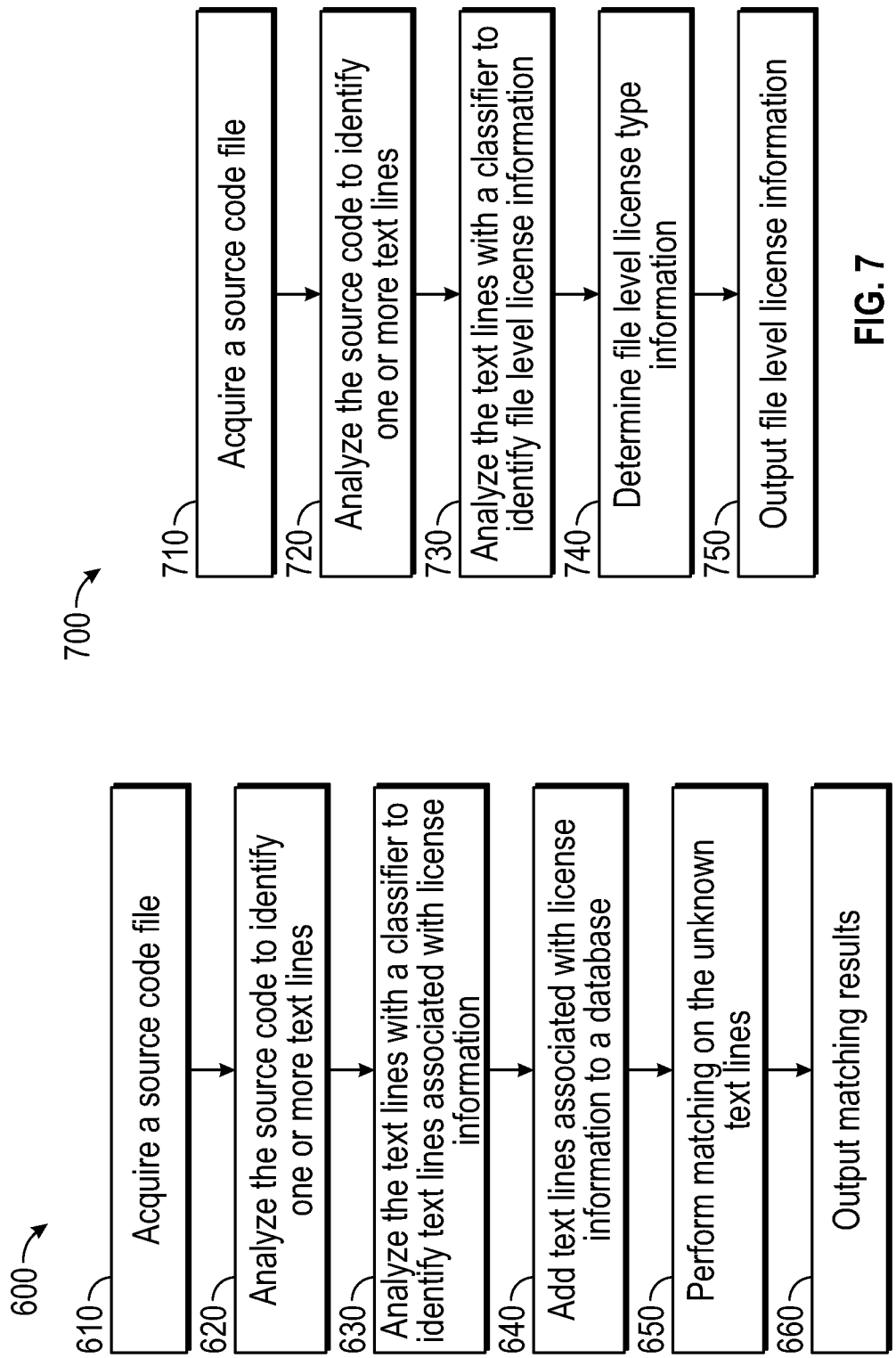

CLASSIFICATION OF PROGRAMMING LANGUAGE CODE INTO BASIC CONSTRUCTS OF SOURCE CODE AND NON-SOURCE CODE

RELATED APPLICATION

This application claims the benefit of U.S. provisional patent application Ser. No. 63/043,957, filed Jun. 25, 2020, which is hereby incorporated herein by reference.

TECHNICAL FIELD

The present disclosure generally relates to a software audit system. In particular, the present disclosure relates to processing a source code file to identify source code and non-source code within the source code file.

BACKGROUND

Source code files are scanned to determine various factors to aid in the evaluation of the source code files. For example, a source code file may be scanned to determine one or more of open source compliance, security risks, and operational risks. The open source compliance, security risks, and operational risks of the source code file are evaluated to determine whether mitigation measures may be required. For example, the source code file may be modified to delete open source code based on an open source code compliance issue. Additionally, or alternatively, security risks and operational risks may be output to a user or another processing system for further evaluation and action.

SUMMARY

In one example, a method for processing a source code file comprises scanning the source code file to identify text lines, and analyzing, via one or more processors, the text lines with a classifier to identify one or more of the text lines that correspond to code construct type information. The code construct type information includes license information. The classifier is trained with sample source code files. The method further comprises generating a subset of the text lines that excludes the one or more of the text lines identified as corresponding to the code construct type information. Further, the method comprises determining first text lines within the subset that correspond to open source code by comparing the subset to a database. The database includes a plurality of text lines associated with open source code.

In one example, a non-transitory computer readable medium comprising stored instructions, which when executed by a processor, cause the processor to scan a source code file to identify text lines, and analyze the text lines with a classifier to identify one or more of the text lines that correspond to code construct type information. The code construct type includes license information. The classifier is trained with sample source code files. The processor is further caused to generate a subset of the text lines that excludes the one or more of the text lines identified as corresponding to the code construct type information, and determine first text lines within the subset that correspond to open source code by comparing the subset to a database. The database includes a plurality of text lines associated with open source code.

In one example, a processing system comprises an analyzing engine, and a matching engine. The analyzing engine is configured to scan a source code file to identify text lines, and analyze the text lines with a classifier to identify one or more of the text lines that correspond to code construct type information. The code construct type includes license information. The classifier is trained with sample source code files. The analyzing engine is further configured to generate a subset of the text lines that excludes the one or more of the text lines identified as corresponding to license information. The matching engine is configured to determine first text lines within the subset that correspond to open source code by comparing the subset to a database. The database includes a plurality text lines associated with open source code.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3A and FIG. 3B illustrate an example source code file, according to one or more examples.

FIG. 6 illustrates a flow chart of a method for processing a source code file, according to one or more examples.

FIG. 7 illustrates a flow chart of a method for processing a source code file, according to one or more examples.

DETAILED DESCRIPTION

Figure 1:
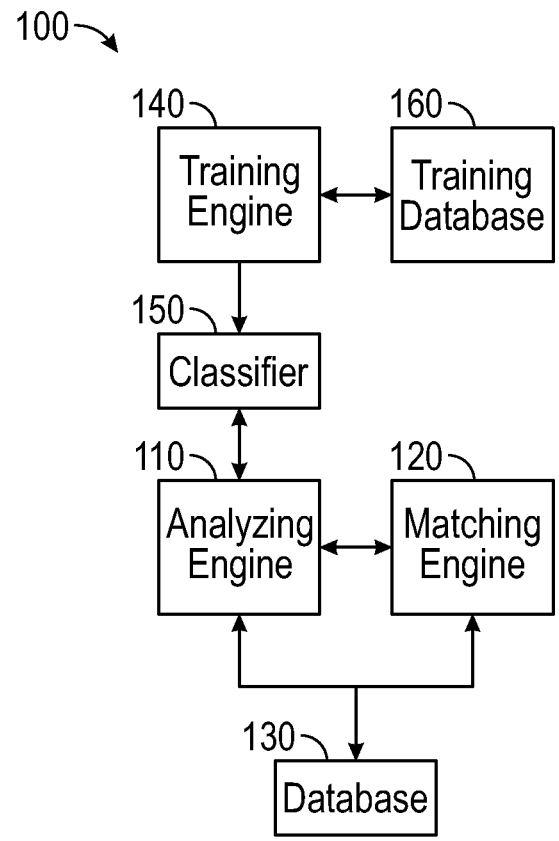
FIG. 1 illustrates a schematic block diagram of source code processing system, according to one or examples.

Aspects of the present disclosure relate to classification of programming language code into basic construct types of source code and non-source code. The basic construct types include, but are not limited to, non-source code such as license information, copyright info, file level license/copyright information, and dependent library information; and source code or program code.

Before being published or released, source code files are analyzed to detect the possible inclusion of potentially harmful program code and other risk factors. Potentially harmful program code includes open source program code. In one example, a source code file is analyzed to determine one or more of an open source compliance, security risks, and operational risks. In various examples, when analyzing the source code file, the source code file is processed to generate text lines, or sub-portions, of the source code file. A text line corresponds to a line of text within a source code file. Multiple text lines may form a snippet. A snippet is a small reusable piece of programming language code. Each text line may include one or more fingerprints. The text lines are analyzed to determine open source compliance issues, security risks, and operational risks.

In one example, open source program code may be added into a proprietary source code file that also includes independently generated source code by an individual, company, or other entity. For example, a developer may find a useful function within an open source program (e.g., a source code file) and copy the corresponding code into a proprietary source code file. By analyzing the source code file, any fragments of open source code (e.g., non-source code) that may be included in the proprietary source code file or moved into a proprietary directory or directories may be detected. However, when analyzing the source code file, common non-source code components (e.g., license statements, copyright statements, and import library statements) may be identified as source code. Accordingly, false positive detections of open source code may be made, degrading customer experience. Analyzing the source code files may also have high processing power and/or processing time costs. For example, source code files are analyzed based on various libraries of source code. Accordingly, as the number of unstructured open source artifacts in libraries increases, the difficulty in identifying the underlying unique open source components used to measure the security and compliance risk factors accurately and completely increases. Accordingly, the accuracy of detecting open source code in a source code file decreases, and the time spent analyzing a source code file increases.

The present disclosure is directed to reducing a probability for false positive open source code detections, increasing the accuracy of detecting open source code, and reducing the amount of time spent on analyzing a source code file. For example, to improve the process for detecting open source code within a source code file, the basic constructs of a programming language source code are classified into "source code and non-source code" aspects by leveraging a Machine Learning (ML) process. In one example, a deep neural network classifier is trained from training data to identify corresponding patterns of text within a source code file. The classifier models the different portions of a source code file (e.g., program code, license information, copyright information, dependent library information, and/or comment information, among others). Further, the classifier analyzes a source code file to identify the portions (e.g., line of text or "text line") of the source code that are associated with program code, license information, dependent library information, copyright information, and comment information, among others. Applying a deep neural network classifier to analyze the identified portions of the source code file, decreases false positive detections, increases the accuracy of detecting open source components, security risks, and compliance risks, and decreases the amount of spent analyzing the source code file. Throughout the following disclosure, source code may be referred to as program code and non-source code may be referred to as non-program code.

FIG. 1 is a block diagram of a source code processing system 100, according to one or more examples. The source code processing system 100 includes an analyzing engine 110, a matching engine 120, a database 130, a training engine 140, a classifier 150, and a training database 160. In one or more examples, two or more of the analyzing engine 110, the matching engine 120, the database 130, the training engine 140, the classifier 150, and the training database 160 may be combined to form different combinations. For example, one or more of the matching engine 120, and the classifier 150 maybe part of the analyzing engine 110. The source code processing system 100 is executed by the computer system 1000 of FIG. 10, in one embodiment. For example, with reference to FIG. 10, the source code processing system 100 includes one or more processing devices (e.g., processing device 1002) that executes instructions (e.g., the instructions 1026) stored in a memory (e.g., the main memory 1004, or the machine-readable storage medium 1024).

The analyzing engine 110 receives source code files and processes the source code files to identify text lines. The analyzing engine 110 receives the source code files from memory device (e.g., a main memory 1004 or data storage device 1018 of FIG. 10). In one example, the source code files are stored within the database 130 and the analyzing engine 110 receives the source code files from the database 130. In one example, the analyzing engine receives the source code files via an input device or another computing system via a network device (e.g., the network interface device 1008 via the network 1020). Processing the source code files is described in greater detail with regard to FIG. 2.

The analyzing engine 110 analyzes the text lines, which are input to the classifier 150. For example, the analyzing engine 110 may analyze the text lines to determine which of the text lines are associated with license information (e.g., license information of a source code file) or are unknown text lines. Unknown text lines are text lines for which it is unknown as to the type of information (e.g., license information, program code, copyright information, comment information, and dependent library information) with which the text lines are associated. A text line is a line of text within the source code file. In one example, the analyzing engine 110 processes the source code files to identify portions of the source code file that that are smaller than a line of text. In such an example, a line of text may be divided into one or more fragments or chunks. For example, a text line may be divided into fragments or chucks by identifying variables and statements within a text line and dividing the text line according to the identified variables and statements, or combinations of variables and statements. While the following description is described with regard to text lines, similar methods may be applied to smaller portions of than text lines, e.g., fragments or chunks.

Figure 10:
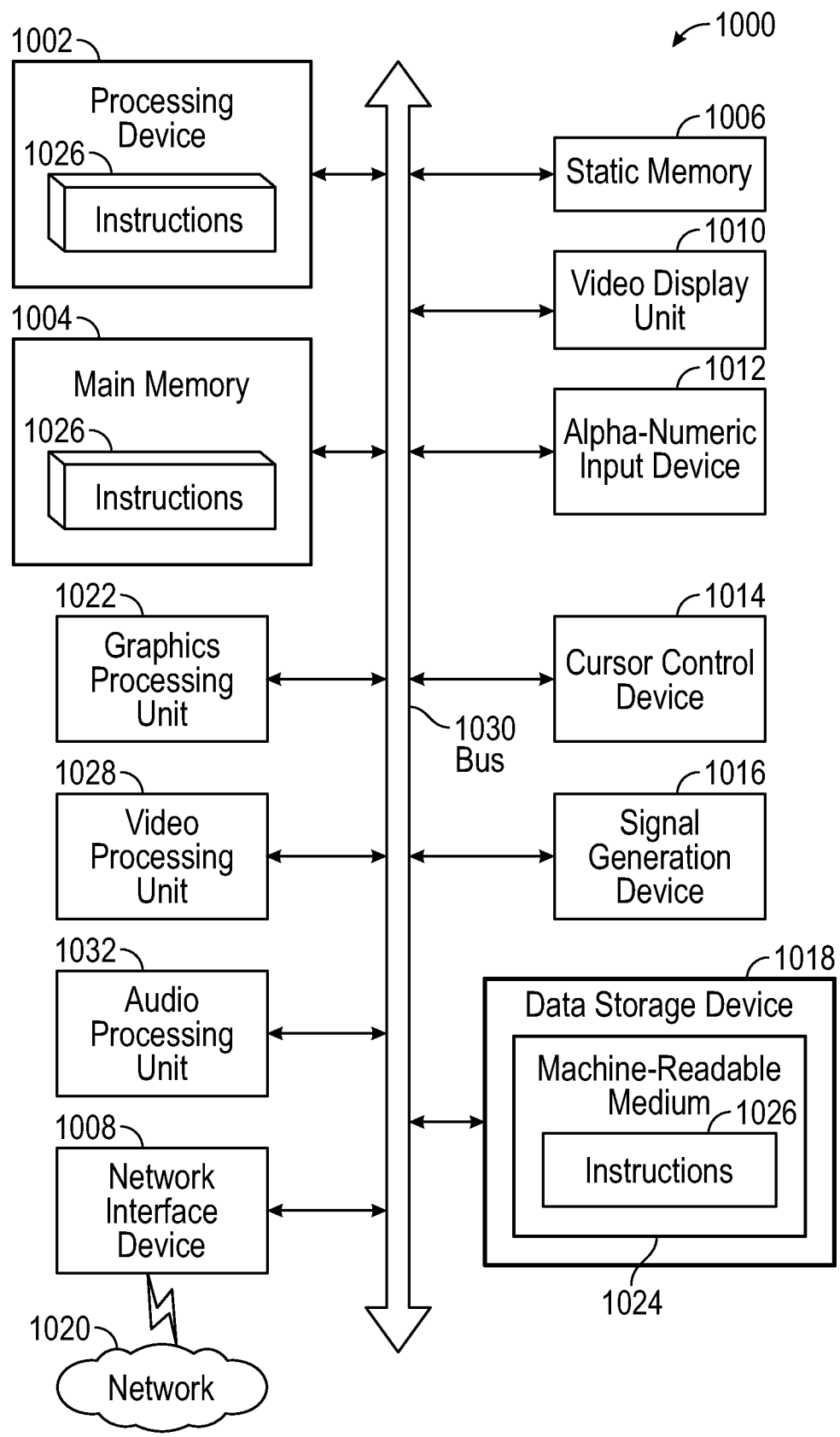
FIG. 10 depicts a diagram of an example computer system in which embodiments of the present disclosure may operate.

With reference to FIG. 10, the analyzing engine 110 is one or more processing devices (e.g., processing device 1002) that executes instructions (e.g., the instructions 1026) stored in a memory (e.g., the main memory 1004, or the machine-readable storage medium 1024). The analyzing engine 110 is commutatively connected to one or more of the matching engine 120, the database 130, and the classifier 150. In one example, the analyzing engine 110 outputs the generated text lines to the matching engine 120. The analyzing engine 110 may store the text lines in the database 130 which is accessible by the matching engine 120. The database 130 is stored in a memory device (e.g., the main memory 1004 of FIG. 10).

As is stated above, the analyzing engine 110 may analyze the text lines to determine which of the text lines are associated with license information or are unknown text lines and outputs the unknown text lines to the classifier 150. In another example, the analyzing engine 110 outputs both the text lines are associated with license information or are unknown text lines to the classifier 150. In another example, the analyzing engine 110 outputs the text lines to the classifier 150 without determining which of the text lines are associated with license information or are unknown text lines.

In one example, to determine which of the text lines are associated with license information and which are not, the analyzing engine 110 compares the text line to the database 130. Text lines associated with license information are text lines that correspond to portions of source code that are associated with a license information. Unknown text lines correspond to portions of a source code file that are not associated with license information, or to portions of the source code file for which an association with license information is unknown. In one example, unknown text lines may correspond to source code, license information, comment information, or dependent library information, among others.

The analyzing engine 110 outputs the unknown text lines to the matching engine 120. Further, the analyzing engine 110 outputs the text lines associated with license information to be stored in the database 130 or another memory device (e.g., the main memory 1004 of FIG. 10). In one example, the analyzing engine 110 outputs the text lines associated with license information and the unknown text lines to the database 130 which is accessible by the matching engine 120.

In one example, the analyzing engine 110 communicates with the classifier 150 to process (e.g., analyze) the text lines to determine the text lines that correspond to code construct type information, wherein the code construct type includes license information. In another example, the classifier 150 analyzes the text lines to determine the text lines that correspond to code construct type information, wherein the code construct type includes license information, source code, dependent library information, comment information, and/or copyright information. The analyzing engine 110 instructs, via an instruction request or some other instruction notification method, the classifier 150 to analyze the text lines to determine the text lines associated with code construct type information. As is described with more detail with regard to method 400 of FIG. 4, the classifier 150 is trained with the training engine 140 based on the training database 160 to model source code. In one example, the classifier 150 is trained to identify source code, license information, copyright information, comment information, and/or dependent library information. The classifier 150 receives the text lines from the analyzing engine 110 and analyzes the text lines via the trained model to identify the text lines associated with one or more of source code, license information, copyright information, comment information, and dependent library information. The classifier 150 may save the classified text lines in the database 130 or another memory device (e.g., the memory 1004 of FIG. 10). Further, the classifier 150 outputs the classified text lines to the matching engine 120. In one example, the classifier 150 may output the classified text lines associated with one or more of source code, license information, copyright information, comment information, and dependent library information.

In one example, the classifier 150 is a deep neural network classifier. In other examples, the classifier 150 may be other types of classifiers. The classifier 150 is trained by the training engine 140 based on training data within the training database 160. For example, the training engine 140 analyzes source code files in a training data set in the training database 160 line by line and trains the classifier 150 based on the analyzed lines. The training engine 140 is one or more processing devices (e.g., processing device 1002) that executes instructions (e.g., the instructions 1026) stored in a memory (e.g., the main memory 1004, or the machine-readable storage medium 1024).

The classifier 150 may be a bidirectional long short-term memory (LSTM) deep neural network classifier. In other examples, the classifier is a convolutional neural network (CNN). Further, in one or more examples, the classifier is a combination of a LSTM deep neural network classifier and a CNN. The classifier 150 may be a neural network classifier that understands the semantics of text by considering a complete line of text at a time to classify the text to be one of program code, comment information, license information, dependent library information, and copyright information.

The matching engine 120 processes the classified text lines to determine the type of open source code, license information, comment information, copyright information, or dependent library information, among others, that is associated with the text lines. In one example, the matching engine 120 generates an output that indicates which text line are associated with open source code, license information, comment information, copyright information, and/or dependent library information, and the corresponding type of source code, license information, comment information, copyright information, and/or dependent library information. The output may be at least one of displayed on a display device (e.g., the video display unit 1010 of FIG. 10), or provided to another processing system for further processing. In one example, the output may be provided to another processing system via a network (e.g., the network interface device 1008 and the network 1020 of FIG. 10). The matching engine 120 is one or more processing devices (e.g., processing device 1002) that executes instructions (e.g., the instructions 1026) stored in a memory (e.g., the main memory 1004, or the machine-readable storage medium 1024).

Figure 2:
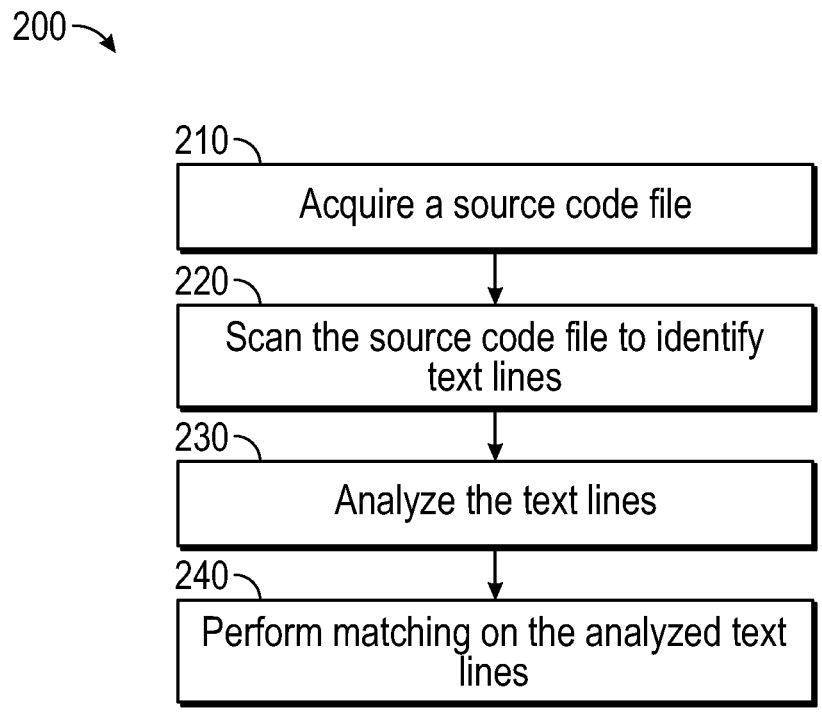
FIG. 2 illustrates a flow chart of a method for processing source code files, according to one or more examples.

FIG. 2 illustrates a flowchart of a method 200 for processing a source code file, according one or more examples. The method 200 is performed by the source code processing system 100 of FIG. 1, in one embodiment. At 210 of the method 200, a source code file is acquired. The source code file is acquired by the analyzing engine 110 of FIG. 1, in one embodiment. In example, the analyzing engine 110 accesses the database 130 or another memory device (e.g., the memory device 1004 of FIG. 10) to acquire the source code file. The source code file includes different construct types corresponding to copyright information, license information, dependent library information, comment information, and program code. FIGS. 3A and 3B illustrate an example source code file 300.

The source code file 300 includes portions 310, 312, 314, 316, and 318. The portion 310 corresponds to copyright information, the portion 312 corresponds to license information, the portion 314 corresponds to dependent library information, the portion 316 corresponds to comment information, and the portion 318 corresponds to program code.

At 220 of the method 200, the source code file is scanned to identify text lines within the source code file. For example, the analyzing engine 110 analyzes the source code file to identify text lines. In one example, a line text includes one or more fingerprints. The text lines are small reusable pieces of a source code file (e.g., the source code file 300). A text line may be a portion of a line of a source code file. The analyzing engine 110 generates the text lines by analyzing the source code file with a hash algorithm. For example, the analyzing engine 110 generates the text lines by analyzing the source code file with a sliding (or rolling) secure hash algorithm or another cryptographic function. In one example, the secure hash algorithm is a secure hash algorithm 1 (SHA-1). In other examples, other secure hash algorithms may be utilized. The size of each of the text lines is 32 bits. Alternatively, the size of the text lines is less than or greater than 32 bits. The analyzing engine 110 outputs the text lines to the database 130.

At 230 of the method 200, the text lines are analyzed. The text lines may be analyzed by classifier 150 and/or by comparing the text lines to the text lines in the database 130. The analyzing engine 110 analyzes the text lines of the source code through the use of the classifier 150. The analyzing engine 110 may communicate the text lines to the classifier 150 and instruct the classifier 150 to process the text lines. The classifier 150 processes the text lines to identify text lines associated with source code, license information, comment information, copyright information, and/or dependent library information based on the trained model of the classifier 150. In one example, the analyzing engine 110 uses the classifier 150 to analyze the text lines of the source code file to determine an associated category for each of the text lines. For example, the classifier 150 analyzes the text lines to determine a respective association for each text line. The classifier 150 may identify corresponding associations of each text line with one of source code, license information, comment information, copyright information, and/or dependent library information. In one example, the classifier 150 identifies text lines associated with only one of source code, license information, comment information, copyright information, and/or dependent library information. In another example, the classifier 150 provides an indication of the association for each text line. The indication may include an identifier (e.g., flag, text identifier) that indicates the association of each text line to one of source code, license information, comment information, copyright information, and/or dependent library information. The classifier 150 stores the classified text lines in a memory (e.g., the memory 1004 of FIG. 10) or the database 130.

In one example, the analyzing engine 110 may additionally, or alternatively, process the text lines based on the database 130. For example, the analyzing engine 110 compares the text lines with text lines in the database 130 to identify text lines associated with license information. The database 130 includes text lines known to be associated with license information. The analyzing engine 110 may generate a subset of the text lines that does not include the text lines associated with license information. The subset is provided to the classifier 150 for further processing. The text lines of the subset may be referred to unknown text lines, as any association between the text lines and license information is not yet determined.

In one example, the analyzing engine 110 outputs the analyzed (e.g., classified) text lines to the matching engine 120 and/or the database 130.

At 240 of the method 200, matching is performed on the analyzed text lines. In one example, the matching engine 120 performs matching on the text lines provided by the analyzing engine 110. In one example, the matching engine 120 matches the text lines with the database 130 to determine whether or not the text lines correspond to open source code of open source software. In one example, the matching engine 120 matches the analyzed text lines against the database 130 that includes text lines from known open source code files. The analyzed text lines are compared to the open source code text lines to determine if the analyzed text lines are associated with the open source code text lines.

As will be described in greater detail with regard FIGS. 7, 8 and 9, to the matching engine 120 performs a matching process on the analyzed (e.g., classified) text lines to determine the type of license information, the type of copyright information, and/or the type of dependent library information.

As is noted above, text lines of open source software may be added into a source code file that includes program code independently generated by an individual or company (e.g., the provider of the source code file). A portion of an open source code file may be copied and added to a source code file. The matching process identifies the portions of open source code used in a source code file. For example, the matching engine 120 compares each of the unknown text lines to the text lines of the database 130 to identify the text lines that correspond to open source code. In one example, the matching engine 120 further determines chucks or fragments of the unknown text lines from the text lines, and compares the chucks or fragments to the database 130.

As compared to other methods of analyzing the text lines of a source code file, analyzing the text lines with a classifier (e.g., the classifier 150) trained to identify associations between text lines and open source code reduces the potential for false positives in the matching process, and increases the speed of the matching process as the amount of data that is analyzed is reduced, freeing up computing resources. In one example, by classifying the text lines, the matching process to identify open source code may be performed on the text lines determined to be associated with source code. Accordingly, errors that may arise from incorrectly determining that text lines associated with license information, comment information, dependent library information, or copyright information are source code are minimized, as these text lines are not used in the matching process to detect source code.

Further, the matching process may also identify the license file information, copyright information, and dependent library information. Each of these are described in greater detail with regard to FIGS. 7-9.

Figure 4A:
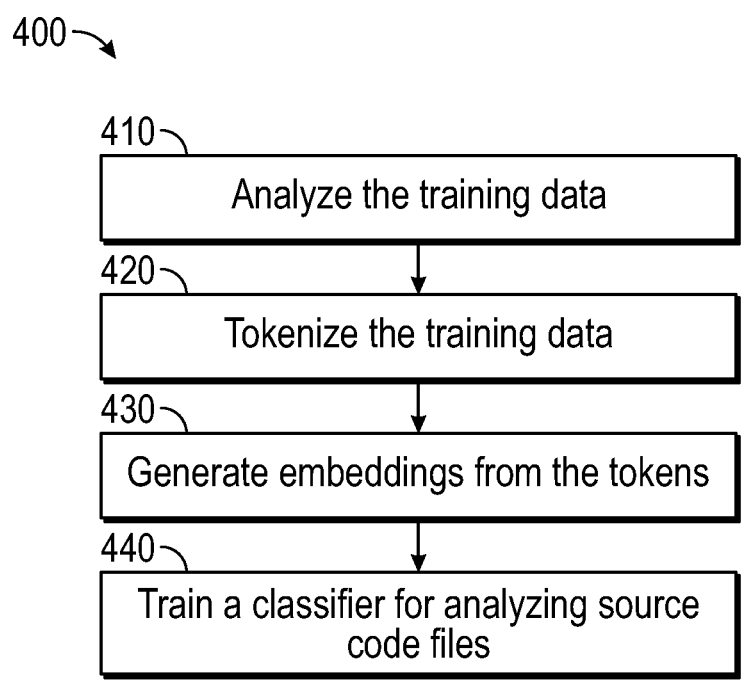
FIG. 4A illustrates a flow chart for training a classifier, according to one or more examples.

FIG. 4A illustrates a flowchart of a method 400 for training the classifier, according to one or more examples. The method 400 is executed by the training engine 140. At 410 of the method 400, training data is analyzed. For example, training engine 140 analyzes the training data within the training database 160 including processing the training data and storing the training data in the training database 160. The training data is analyzed by processing source code files based on keywords and other parameters. The training data may include source code files corresponding with java programming languages, python programming languages, c programming languages, and c++ programming languages.

In one example, the training engine 140 processes each source code file in the training data line by line to determine whether or not each line is associated with one or more of program code, license information, copyright information, comment information, or dependent library information, among others. A keyword search or pattern matching may be used to determine whether or not a line of a source code file is associated with program code, license information, comment information, copyright information, or dependent library information. For example, the keyword search may be based on a known list of keywords associated with each of the license information, copyright information, dependent library information, program code, and comment information to determine the association of each line of each source code file. In the flow diagram 450 of FIG. 4B, the source code file 452 is processed by the training engine 140 with a keyword search and/or pattern matching to identify text lines of text lines that are associated with program code, license information, comment information, copyright information, or dependent library information.

In one example, to identify comments, each line of each source code file in the training data is analyzed to identify one or more of hash tags, forward slashes, and asterisks, among others. In one example, to identify copyright information, each line of each source code file in the training data is analyzed to identify keywords associated with copyrights. The keywords may be stored in the training database 160. In one example, keywords such as copyright, "©", "@", MIT, or Apache, among others, may be used to determine whether or not a line is associated with copyright information. To identify dependent library information, each line of each source code file in the training data set is analyzed to identify keywords associated with dependent library information. For example, keywords such as "import" and "library", and the like, may be used to determine whether or not a line is associated with dependent library information.

In one example, to identify program code within the training data, each line of each source code file is analyzed with one or more programming construct patterns. For example, the programing construct patterns include one or more of brackets, equal signs, commas, ampersands, greater than signs, less than signs, semicolons, and plus signs, among others.

Processing the training data identifies text lines of each source code file in the training data set associated with program code, license information, copyright information, comment information, and dependent library information. The associations of the source code file in the training data are stored within the training database 160. The database identifies which text lines of the source code files of the training data set are associated with program code, license information, copyright information, comment information, and dependent library information.

Figure 4B:
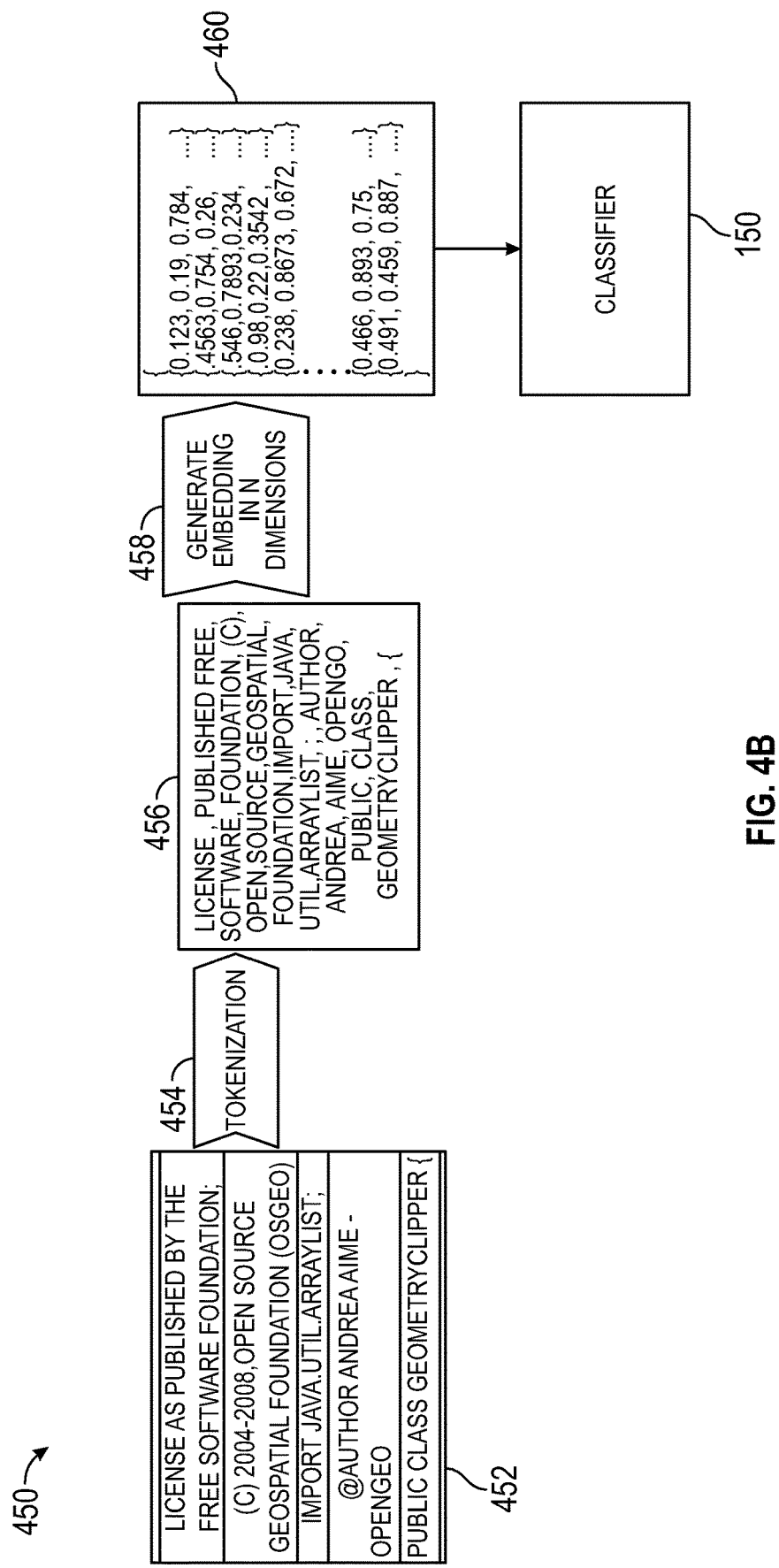
FIG. 4B illustrates a diagram for training a classifier, according to one or more examples.

At 420 of the method 400, the training data is tokenized. Tokenizing the training data creates tokens from each source code file of the training data. For example, the training engine 140 tokenizes each of the lines within the training database 160. In one example, each text line associated with program code is tokenized to generate tokens corresponding to program code. Further, each text line associated with license information is tokenized to generate tokens corresponding to license information, each text line associated with copyright information is tokenized to generate tokens corresponding to copyright information, each text line associated comment information is tokenized to generate tokens corresponding to dependent library information, and each text line associated with dependent library information is tokenized to generate tokens corresponding to dependent library information. With reference to FIG. 4B, the source code file 452 is tokenized at 454 to generate the tokens 456.

Creating the tokens includes analyzing the text line of the source code files of the training data to divide the text line into tokens (e.g., tokens 456 of FIG. 4B). In one example, during tokenization, boundaries between words in each text line are identified, punctuation is ignored, and the text of each text line or fingerprint is divided into smaller segments. Further, stop words may be identified and discarded. Stop words are commonly used words (e.g., the, a, an, and in, among others). Tokenization may identify one or more tokens within each text line of each source code file. Example tokens 456 include one or more of "license", "published free", "software", "foundation", "(C)", "open", "source geospatial", "foundation", "import", "java", "util", "arraylist", ";", "author", "Andrea", "Aime", "opengo", "public", "class", and "geometryclipper", among others. The tokens 456 are stored in the training database 160. In one example, known program code, license information, comment information, dependent library information, and copyright information may be processed to generate a list of example tokens to be used when processing the source code files of the training data set.

Figure 5:
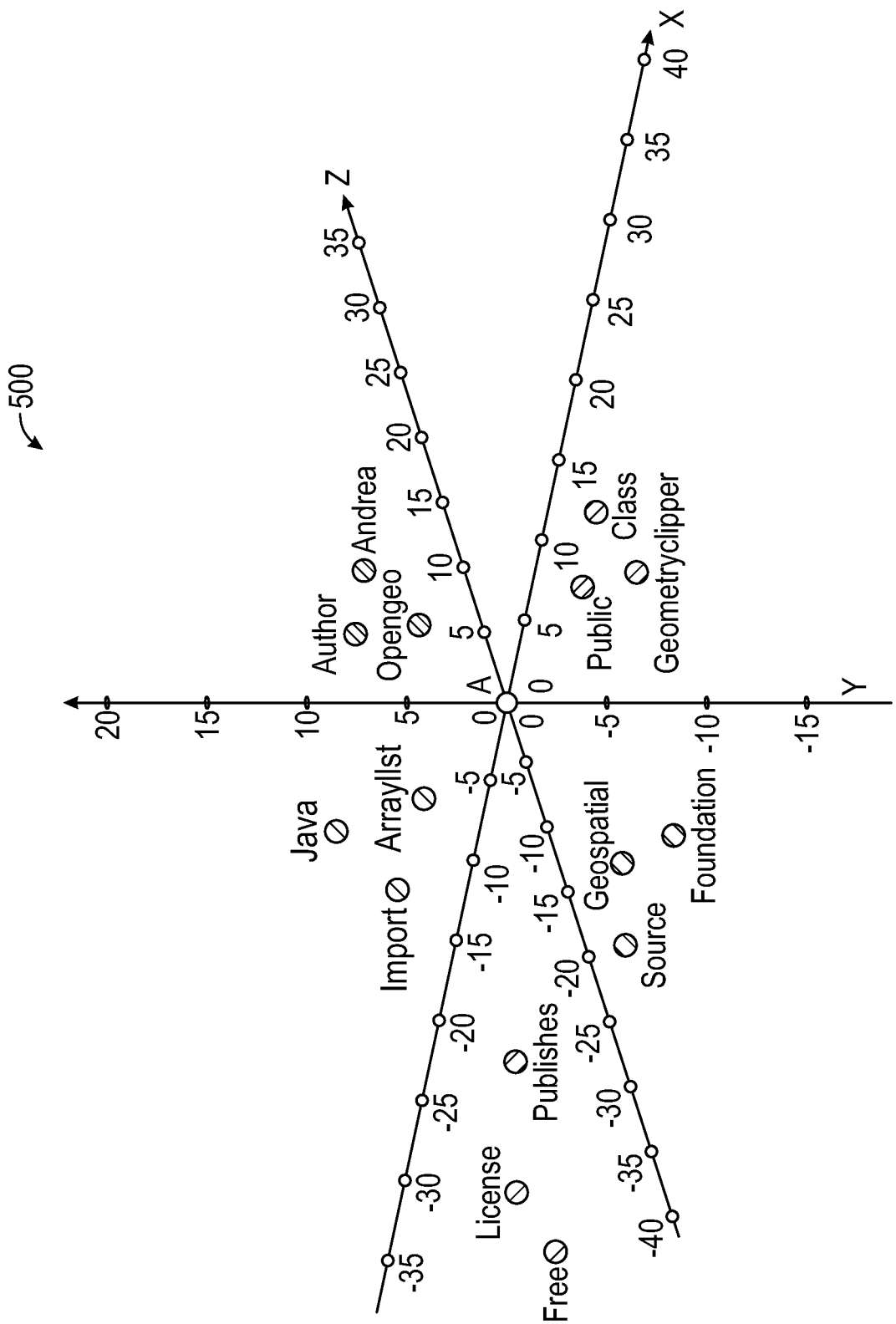
FIG. 5 illustrates example embeddings in a vector space, according to one or more examples.

At 430 of the method 400, embeddings are generated from the tokens. For example, the training engine 140 generates the embeddings from the tokens. As illustrated in FIG. 4B, generating the embeddings includes converting the tokens to embedding sequences in N dimensions at process 458. N is one or more. Generating the embeddings generates a vector representation for each token in an X, Y, Z space. FIG. 5 illustrates embeddings 500 projected in 3-Dimensional (3D) space along X, Y, and Z coordinates. The embeddings 500 illustrate the tokens plotted in different quadrants within the 3D space. The training engine 140 captures semantics using the embeddings to generate a continuous vector representation of tokens in N dimensional space for sample source code. In one example, N varies as corresponding data set increases in size. For example, as the corresponding data set increases, N increases in size. In one example, N is one or more. Determining the embeddings includes placing semantically similar tokens (e.g., entities) close to each other in vector space. For example, tokens that have a position closer to each other in the vector space are more similar in meaning as compared to tokens that have a position further away from each other in the vector space. In one example, tokens that do not share the same line of a source code file, but share a similar semantic meaning and/or pattern are represented by points within the vector space having a position in close proximity to each other. Vectors are generated from the embedding sequences of the embeddings 500. The vectors represent each token within each sample code file of the training data set. FIG. 4B illustrates example vectors 460 that may be generated from the embedding sequences of the embeddings 500. The vectors are stored within the training database 160 by the training engine 140.

At 440 of the method 400, the classifier is trained. For example, the training engine 140 trains the classifier 150 based on the vectors (e.g., vectors 460 of FIG. 4B) of the embeddings 500 determined during 430 of the method 400. Training the classifier 150 based on the vectors of the embeddings 500 trains the classifier 150 to identify license information, copyright information, comment information, and dependent library information. The classifier 150 is trained to identify the license information based on vector data associated with program data and license information within the training data set. The classifier 150 is trained to identify the copyright information based on vector data associated with copyright information within the training data set. The classifier 150 is trained to identify the comment information based on vector data associated with comment information within the training data set. The classifier 150 is trained to identify the dependent library information is based on vector data associated with dependent library information within the training data set. In one example, training the classifier 150 generates a model that may be used by the classifier to analyze source code files to identify program code, license information, comment information, copyright information, and/or dependent library information, among others.

As is described in greater detail with regard to FIGS. 6-9, the classifier 150 classifies the text of source code files to identify program code, license information, comment information, copyright information, and/or dependent library information, among others.

FIG. 6 illustrates a flow chart of a method 600 for analyzing a source code file, according to one or more examples. The method 600 is executed by the source code processing system 100 of FIG. 1, in one embodiment. At 610 of the method 600, a source code file is acquired. For example, the analyzing engine 110 acquires a source code file. The source code file may be similar to the source code file 300 of FIGS. 3A and 3B. For example, the source code file includes one or more text lines associated with program code, license information, comment information, dependent library information, and copyright information.

At 620 of the method 600, the source code file is analyzed to identify one or more text lines. For example, the analyzing engine 110 analyzes the source code file to identify the different lines of text (e.g., text lines) of the source code file. As is noted above with regard to 220 of FIG. 2, the text lines may be generated by a hash algorithm. The identified text lines are stored with the database 130 of a memory, e.g., the main memory 1004 of FIG. 10. The text lines and respective associations are stored within the database 130 within the memory. The identified text lines include one or more of program code text lines, license information text lines, comment text lines, copyright text lines, and dependent library text lines. In one example, a flat-file database is used to store the text lines and respective associations with the text line type.

At 630 of the method 600, a classifier (e.g., the classifier 150) analyzes the text lines identified at 620 of 600 to identify the text lines that are associated with license information. In one example, the analyzing engine 110 instructs the classifier 150 to analyze the text lines identified at 620 of 600 to identify text lines of the source code file that are associated with license information. For example, the text lines of the source code file that are associated with license information (e.g., portion 312 of FIG. 3A). In one example, license information refers to the license information of a source code file (e.g., portion 312 of FIG. 3A) that identifies the open source agreement and/or license associated with the included open source code.

In one example, the analyzing engine 110 identifies portions of the source code file that are also associated with license information. The analyzing engine 110 may identify the text lines of the source code file that are associated with license information before the text lines are analyzed by the classifier 150. The analyzing engine 110 may compare the text lines against the database 130 to detect which text lines of the source code file correspond to license information. Further, in such an example, the analyzing engine 110 outputs the text lines not determined to be associated with license information to the classifier 150 for further analyzing as is described above with regard to 630 of the method 600.

At 640 of the method 600, the text lines associated with license information are added to a database. For example, the text lines associated with license information are added to the database 130. Further, the text lines associated with license information are removed from the text lines that are to be further analyzed, generating a subset of text lines for further processing. In one example, the text lines associated with license information are excluded such that further processing is not applied to the text lines associated with license information.

The text lines not determined to be associated with license information by the classifier 150, and, in one example, the analyzing engine 110, are added to a matching database for further processing as unknown text lines. The matching database may be stored in a memory (e.g., the main memory 1004 of FIG. 10). In one example, the matching database is stored as part of the database 130.

At 650 of the method 600, matching is performed on the unknown text lines of the source code file. For example, the matching engine 120 performs matching on the unknown text lines in the matching database. In one example, the matching engine 120 matches the unknown text lines against the database 130 to determine whether or not the unknown text lines correspond to open source code. The matching process identifies which of the unknown text lines of the source file correspond to open source code and which text lines do not correspond to open source. In one example, the matching engine 120 matches the unknown text lines against open source software text lines and/or other types of program code text lines in the database 130. In one example, the matching may be completed via a keyword search. The keywords are determined from the text lines stored in the database 130. For example, the keywords are generated from the open source code and stored within database 130. The matching engine 120 compares the unknown text lines against known open source text lines based on keyword searching to determine which of the unknown text lines correspond to open source code and which text lines do not correspond to open source. In one example, the keywords are determined from text lines known to correspond to open source code.

At 660 of the method 600, the matching results are output. The matching results include the text lines determined to be associated with open source code. In one example, the matching results may include a list of the text lines determined to be associated with open source code or an indication (e.g., a flag, highlighting, bolded text, or another indication) within the source code of the text lines determined to be associated with open source code. For example, the source code processing system 100 outputs the matching results to a memory (e.g., the main memory 1004 of FIG. 10), to a display (e.g., the video display unit 1010 of FIG. 10), and/or another processing system via a network interface (e.g., the network interface device 1008 and the network 1020 of FIG. 10) or another interface.

In one example, the matching results are output to a snippet matching engine. The snippet matching engine may be part of the source code processing system 100 or a processing system connected to the source code processing system 100. The matching results indicate which of the unknown text lines do not correspond with a license and which do correspond to a license. In one example, the matching results indicate which of the unknown text lines do not correspond to a license. The matching results are used to determine a risk level associated with the source code file based on the amount of open source code text lines in the source code file. In one example, the risk level corresponds to open source program risks.

Open source program risks include security risks and/or compliance risks. Security risks correspond to the susceptibility of at least a portion of the source code file of being infiltrated by another party or unauthorized access. The security risk may correspond to a binary output, e.g., a security risk exists or does not exist, or a non-binary output where different values correspond to different levels of security risk. For example, the non-binary output may correspond to a range of values from 1-5, where 1 corresponds to a low security risk and 5 corresponds to a high security risk. A low security risk is associated with source code that is difficult to infiltrate or access without authorization. For example, the code may behind one or more firewalls and/or is difficult to access by another as it does not include open source code. A high security risk corresponds to code that is susceptible to being infiltrated or accessed by unauthorized actor as it includes open source code. Compliance risk corresponds to whether or not the source code file includes a license to the included non-source program code, the source code file includes the correct attributes for the included non-source program code, and/or the source code file includes copyright information corresponding to the included non-source code. The compliance risk may be a binary output indicating if a compliance risk exists or not or a non-binary output having a range of values and corresponding risk levels. For example, the non-binary output may correspond to a range of values from 1-5, where 1 corresponds to a low compliance risk and 5 corresponds to a high compliance risk. The security risk and compliance risk may be combined into a single value for reporting and/or outputting. Alternatively, the security risk and compliance risk are reported (outputted) as separate values. Further, the portion of the source code file corresponding to the security risk and/or compliance risk may be identified and reported (outputted) with the associated security risk and/or compliance risk. In such examples, as compared to systems that do not utilize a deep neural network classifier, more accurate snippet matching results are generated, improving customer experience.

FIG. 7 illustrates a flow chart of a method 700 for analyzing a source code file, according to one or more examples. The method 700 may be executed by the source code processing system 100 of FIG. 1. 710 and 720 of the method 700 are similar to 610 and 620 of the method 600. For example, at 710 the analyzing engine 110 acquires a source code file.

At 720 of the method 700, the source code file is analyzed to identify one or more text lines. 720 of the method 700 is similar to 620 of the method 600. For example, the analyzing engine 110 generates one or more text lines associated with program code, license information, comment information, dependent library information, and copyright information from the source code file.

At 730 of the method 700, a classifier (e.g., the classifier 150) analyzes the text lines identified at 720 of 700 to identify the text lines that are associated with license information. In one example, the analyzing engine 110 communicates with the classifier 150 to analyze the text lines identified at 720 of 700 to identify text lines of the source code file that are associated with license information. For example, the text lines of the source code file that are associated with license information (e.g., portion 312 of FIG. 3A).

At 740 of the method 700, the file level license type information is determined. For example, the matching engine 120 analyzes the text lines of the source code file associated with the license information to determine the file level license type. The file level license type includes the type of license or licenses used within the source code file. The license type includes an Apache license, MIT license, and other types of opens source software. Determining the file level license type includes performing a keyword search based on a keyword or keywords associated with each open source software type. For example, the text lines identified to be associated with licensed portions of source code file may be searched with keywords such as "Apache", and "MIT", among others, to determine the file level license type. The open source software type is determined from the keyword, or keywords, found within the text lines. For example, if the keyword "Apache" is found, the source code file may be determined to include Apache open source software code.

At 750 of the method 700, the file level license information is output. For example, the source code processing system 100 outputs file level license information to a memory (e.g., the main memory 1004 of FIG. 10), to a display (e.g., the video display unit 1010 of FIG. 10), and/or another processing system via an interface (e.g., the network interface device 1008 and the network 1020 of FIG. 10).

Figure 8:
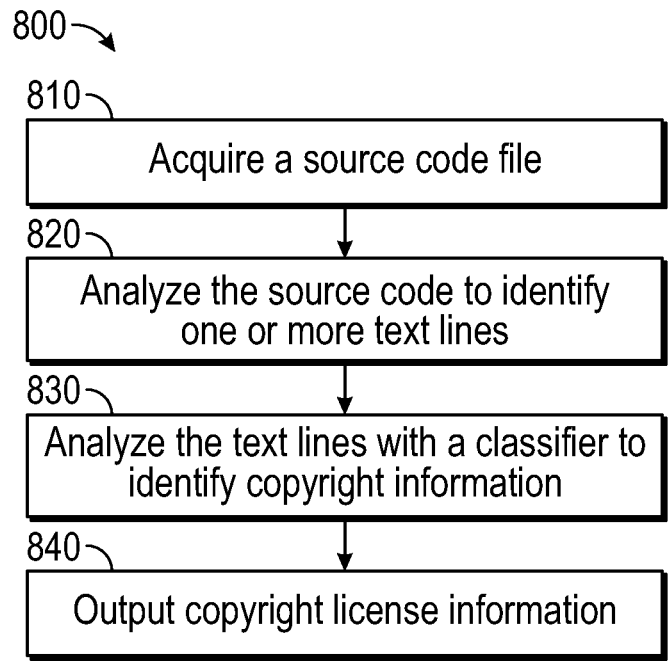
FIG. 8 illustrates a flow chart of a method for processing a source code file, according to one or more examples.

FIG. 8 illustrates a flow chart of a method 800 for analyzing a source code file, according to one or more examples. The method 800 may be executed by the source code processing system 100 of FIG. 1. 810 and 820 of the method 800 are similar to 610 and 620 of the method 600. For example, at 810 the analyzing engine 110 acquires a source code file. Further, at 820 of the method 800, the source code file is analyzed to identify one or more text lines. For example, the analyzing engine 110 generates one or more text lines associated with program code, license information, comment information, dependent library information, and copyright information At 830 of the method 800, a classifier (e.g., the classifier 150) is applied to the text lines identified at 820 of 800 to identify the text lines that are associated with copyright information. In one example, the analyzing engine 110 instructs the classifier 150 to analyze the text lines identified at 820 of 800 to identify text lines of the source code file that are associated with copyright information. The text lines of the source code file that are associated with copyright information correspond to copyright data (e.g., portion 310 of FIG. 3A).

At 840 of the method 800, the copyright information is output. For example, the source code processing system 100 outputs the copyright information to a memory (e.g., the main memory 1004 of FIG. 10), to a display (e.g., the video display unit 1010 of FIG. 10), and/or another processing system via an interface (e.g., the network interface device 1008 and the network 1020 of FIG. 10). In one example, the outputted copyright information may include each text line determined to be associated with copyright information. In one example, the text lines of the copyright information are further processed to determine the copyright information to output. For example, the text lines determined to be associated with copyright information may be searched via keywords to determine the copyright owner, and/or copyright dates. The copyright owner, copyright dates, and other copyright information are output via a display (e.g., the video display unit 1010 of FIG. 10) or to a memory (e.g., the main memory 1004 of FIG. 10).

Figure 9:
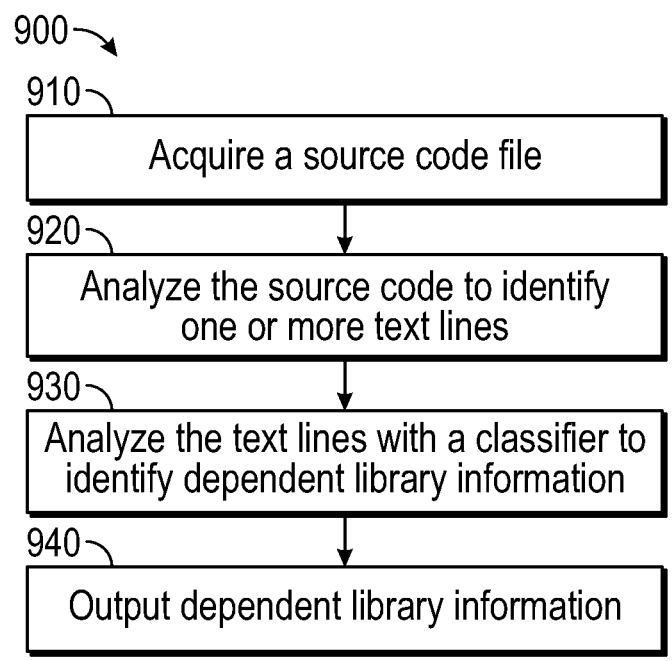
FIG. 9 illustrates a flow chart of a method for processing a source code file, according to one or more examples.

FIG. 9 illustrates a flow chart of a method 900 for analyzing a source code file, according to one or more examples. The method 900 may be executed by the source code processing system 100 of FIG. 1. 910 and 920 of the method 900 are similar to 610 and 620 of the method 600. For example, at 910, the analyzing engine 110 acquires a source code file. At 920 of the method 900, the source code file is analyzed to identify one or more text lines. For example, the analyzing engine 110 generates one or more text lines associated with program code, license information, comment information, dependent library information, and copyright information from the source code file.

At 930 of the method 900, a classifier (e.g., the classifier 150) is applied to the text lines identified at 920 of 900 to identify the text lines that are associated with dependent library information. In one example, the analyzing engine 110 communicates with the classifier 150 to analyze the text lines identified at 920 of 900 to identify text lines of the source code file that are associated with dependent library information. For example, the text lines of the source code file that are associated with dependent library information are dependent data as indicated by portion 314 of FIG. 2).

At 940 of the method 900, the dependent library information is output. For example, the source code processing system 100 outputs the dependent library information to a memory (e.g., the main memory 1004 of FIG. 10), to a display (e.g., the video display unit 1010), and/or another processing system via an interface (e.g., the network interface device 1008 and the network 1020 of FIG. 10). In one example, the dependent library information output may include each text lines determined to be associated with dependent library information. In one example, the text lines of the dependent library information are further processed to determine which dependent library or libraries are referenced. For example, a text line determined to be associated with dependent library information may be searched via keywords to determine the referenced dependent libraries and the referenced dependent libraries are output. The dependent library information is output via a display (e.g., the video display unit 1010 of FIG. 10) or to a memory (e.g., the main memory 1004 of FIG. 10).

In one or more examples, the analyzing engine 110, the matching engine 120, and the classifier 150 analyze a source code file to identify comment information from within the source code file, similar to as described with regard to methods 600, 700, 800 and 900.

In one or more examples, two or more of the methods 600, 700, 800, and 900 may be performed in parallel. For example, the methods 600 and 700 may be performed in parallel. In such an example, 630 of the method 600 may occur after 720 of the method 700. Further, one or more of 630, 640, 650, and 660 may occur in parallel with one or more of 730, 740 and 750. In one example, 650 and 750 may be combined into a single step. In another example, the methods 600, 700, 800, and 900 may be performed in parallel. In such an example, 630 of the method 600, 730 of the method 700, and 830 of the method 800 may occur after 920 of the method 900. Further, one or more of 630-660 of the method 600, one or more of 730-750 of the method 700, and one or more of 830-840 of the method 800 may occur in parallel with one or more of 930-940 of the method 900. In one example, two or more of 650 of the method 600, 750 of the method 700, 840 of the method 800, and 940 of the method 900 may be combined into a single step.

In one or more examples, two or more of the methods 600, 700, 800, and 900 may be performed serially. For example, at least a portion of the methods 600 and 700 may be performed serially. In such an example, 630 of the method may occur after 720 of the method 700. Further, one or more of 730, 740 and 750 of the method 700 occur after and in serial with one or more of 630, 640, 650, and 660 the method 600. In another example, at least a portion of the methods 600, 700, 800, and 900 may be performed in serial. In such an example, 630 of the method 600, 730 of the method 700, and 830 of the method 800 may occur after 920 of the method 900. Further, one or more of 630-660 of the method 600 occur before in serial with one or more of 730-750 of the method 700, one or more of 830-840 of the method 800, and one or more of 930-940 of the method 900.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for processing a source code file, the method comprising:
    scanning the source code file to identify text lines;
    analyzing, via one or more processors, the text lines with a classifier to identify one or more of the text lines that correspond to license information, and wherein the classifier is trained with sample source code files;
    generating a subset of the text lines, wherein the subset excludes the one or more of the text lines identified as corresponding to the license information;
    determining whether text lines within the subset are open source code by comparing the subset to a database, wherein the database includes a plurality of text lines associated with open source code; and
    outputting first text lines of the text lines that are the open source code with at least one or more of a security risk and a compliance risk for the source code file.

2. The method of claim 1, wherein analyzing the text lines with the classifier further comprises identifying a second one or more of the text lines that correspond to at least one of copyright information and dependent library information.

3. The method of claim 1 further, wherein outputting the first text lines comprises outputting the first text lines to a memory.

4. The method of claim 1, wherein the classifier is trained with the sample source code files stored within a training database to identify text lines corresponding to the license information.

5. The method of claim 4 further comprising:
    analyzing the text lines with the classifier to determine second text lines of the text lines that correspond with the license information; and
    determining file level license information by analyzing the second text lines.

6. The method of claim 4, wherein the classifier further trained to identify text lines corresponding to copyright information and dependent library information.

7. The method of claim 6 further comprising at least one of:
    analyzing the text lines with the classifier to determine second text lines associated with the copyright information; or
    analyzing the text lines with the classifier to determine third text lines associated with the dependent library information.

8. The method of claim 1 further comprising:
    analyzing the text lines to identify second text lines associated with the license information and third text lines not associated with the license information, wherein analyzing the text lines with the classifier comprises analyzing the third text lines and not the second text lines.

9. A non-transitory computer readable medium comprising stored instructions, which when executed by a processor, cause the processor to:
scan a source code file to identify text lines;
analyze the text lines with a classifier to identify one or more of the text lines that correspond to license information, and wherein the classifier is trained with sample source code files;
generate a subset of the text lines, wherein the subset excludes the one or more of the text lines identified as corresponding to the license information;
determine whether text lines within the subset are open source code by comparing the subset to a database, wherein the database includes a plurality of text lines associated with open source code; and
output first text lines of the text lines that are the open source code with at least one or more of a security risk and a compliance risk for the source code file.

10. The non-transitory computer readable medium of claim 9, wherein analyzing the text lines with the classifier further comprises identifying a second one or more of the text lines that correspond to at least one of copyright information and dependent library information.

11. The non-transitory computer readable medium of claim 9, wherein outputting the first text lines comprises outputting the first text lines to a memory.

12. The non-transitory computer readable medium of claim 9, wherein the classifier is trained with the sample source code files stored within a training database to identify the license information.

13. The non-transitory computer readable medium of claim 12, wherein the classifier further trained to identify copyright information and dependent library information.

14. The non-transitory computer readable medium of claim 13, wherein the processor is further caused to:
analyze the text lines with the classifier to determine second text lines of the text lines associated with the license information; and
determine file level license information by analyzing the second text lines associated with the license information.

15. The non-transitory computer readable medium of claim 13, wherein the processor is further caused to at least one of:

analyze the text lines with the classifier to determine second text lines of the text lines associated with copyright information; or
analyze the text lines with the classifier to determine third text lines of the text lines associated with dependent library information.

16. A processing system comprising:
an analyzing engine configured to:
scan a source code file to identify text lines;
analyze the text lines with a classifier to identify one or more of the text lines that correspond to license information, and wherein the classifier is trained with sample source code files; and
generate a subset of the text line, wherein the subset excludes the one or more of the text lines identified as corresponding to the license information; and
a matching engine configured to:
determine whether text lines within the subset are open source code by comparing the subset to a database, wherein the database includes a plurality text lines associated with open source code; and
output first text lines of the text lines that are the open source code with at least one or more of a security risk and a compliance risk for the source code file.

17. The processing system of claim 16, wherein analyzing the text lines with the classifier further comprises identifying a second one or more of the text lines that correspond to at least one of copyright information and dependent library information.

18. The processing system of claim 16, wherein outputting the first text lines comprises outputting the first text lines to a memory.

19. The processing system of claim 16, wherein the classifier is trained with the sample source code files stored within a training database to identify the license information.

20. The processing system of claim 19, wherein the matching engine is further configured to, at least one of:
determine file level license information by analyzing the text lines of the subset;
determine copyright information by analyzing the text lines of the subset; and
determine dependent library information by analyzing the text lines of the subset.

* * * * *